(12) United States Patent
Adiletta et al.

(10) Patent No.: US 10,348,327 B2
(45) Date of Patent: *Jul. 9, 2019

(54) TECHNOLOGIES FOR PROVIDING POWER TO A RACK

(71) Applicant: Intel Corporation, Santa Clara, CA (US)

(72) Inventors: Matthew J. Adiletta, Bolton, MA (US); Aaron Gorius, Upton, MA (US); Myles Wilde, Charlestown, MA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,652

(22) Filed: Dec. 31, 2016

(65) Prior Publication Data

US 2018/0027688 A1    Jan. 25, 2018

Related U.S. Application Data

(60) Provisional application No. 62/356,969, filed on Jul. 22, 2016, provisional application No. 62/376,859, (Continued)

(51) Int. Cl.
*H05K 7/14* (2006.01)
*H03M 7/30* (2006.01)
(Continued)

(52) U.S. Cl.
CPC ....... *H03M 7/3084* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01);
(Continued)

(58) Field of Classification Search
CPC .......................... H05K 7/1492; H05K 7/1489
USPC ........................................................ 361/727
See application file for complete search history.

(56) References Cited

U.S. PATENT DOCUMENTS

| | | | |
|---|---|---|---|
| 7,948,196 B2 * | 5/2011 | Begun | H05K 7/20209 318/268 |
| 8,472,183 B1 * | 6/2013 | Ross | H05K 7/20736 361/679.48 |

(Continued)

OTHER PUBLICATIONS

International search report for PCT application No. PCT/US2017/038516, dated Aug. 30, 2017 (3 pages).

(Continued)

*Primary Examiner* — Rockshana D Chowdhury
(74) *Attorney, Agent, or Firm* — Barnes & Thornburg LLP

(57) ABSTRACT

A rack for supporting sleds includes a pair of elongated support posts and pairs of elongated support arms that extend from the elongated support posts. Each pair of the elongated support arms defines a sled slot to receive a corresponding sled. A power supply is attached to an elongated support arm of each pair of elongated support arms to provide power to a corresponding sled. The power supply may include a chassis-less circuit board substrate that is removable from a power supply housing coupled to the corresponding elongated support arm.

19 Claims, 16 Drawing Sheets

Related U.S. Application Data filed on Aug. 18, 2016, provisional application No. 62/427,268, filed on Nov. 29, 2016.

(51) Int. Cl.

| | |
|---|---|
| H03M 7/40 | (2006.01) |
| G06F 3/06 | (2006.01) |
| G11C 7/10 | (2006.01) |
| G06F 1/18 | (2006.01) |
| G06F 13/40 | (2006.01) |
| H05K 5/02 | (2006.01) |
| G08C 17/02 | (2006.01) |
| H04L 12/24 | (2006.01) |
| H04L 29/08 | (2006.01) |
| H04L 12/26 | (2006.01) |
| H04L 12/851 | (2013.01) |
| H04Q 11/00 | (2006.01) |
| G06F 9/50 | (2006.01) |
| G06F 12/109 | (2016.01) |
| H04L 29/06 | (2006.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H05K 7/20 | (2006.01) |
| H04L 12/931 | (2013.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| G06F 17/30 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/911 | (2013.01) |
| H04L 12/811 | (2013.01) |
| H04W 4/80 | (2018.01) |
| H04L 12/781 | (2013.01) |
| G06Q 10/08 | (2012.01) |
| G06Q 10/00 | (2012.01) |
| G06Q 50/04 | (2012.01) |
| H04L 12/933 | (2013.01) |
| H04L 12/947 | (2013.01) |

(52) U.S. Cl.
CPC .............. *G06F 1/183* (2013.01); *G06F 3/061* (2013.01); *G06F 3/064* (2013.01); *G06F 3/067* (2013.01); *G06F 3/0611* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 17/30949* (2013.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 47/24* (2013.01); *H04L 47/38* (2013.01); *H04L 47/765* (2013.01); *H04L 47/805* (2013.01); *H04L 47/82* (2013.01); *H04L 49/45* (2013.01); *H04L 49/555* (2013.01); *H04L 67/02* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01);

H04L 67/12 (2013.01); H04L 67/16 (2013.01); H04L 67/306 (2013.01); H04L 67/34 (2013.01); H04L 69/04 (2013.01); H04L 69/329 (2013.01); H04Q 1/04 (2013.01); H04Q 11/00 (2013.01); H04Q 11/0003 (2013.01); H04Q 11/0005 (2013.01); H04Q 11/0062 (2013.01); H04Q 11/0071 (2013.01); H04W 4/023 (2013.01); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1447 (2013.01); H05K 7/1461 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); G06F 2209/5019 (2013.01); G06F 2209/5022 (2013.01); G06F 2212/1008 (2013.01); G06F 2212/1024 (2013.01); G06F 2212/1041 (2013.01); G06F 2212/1044 (2013.01); G06F 2212/152 (2013.01); G06F 2212/202 (2013.01); G06F 2212/401 (2013.01); G06F 2212/402 (2013.01); G06F 2212/7207 (2013.01); G06Q 10/087 (2013.01); G06Q 10/20 (2013.01); G06Q 50/04 (2013.01); G08C 2200/00 (2013.01); H04B 10/25 (2013.01); H04L 41/12 (2013.01); H04L 41/5019 (2013.01); H04L 43/065 (2013.01); H04L 45/52 (2013.01); H04L 47/782 (2013.01); H04L 47/823 (2013.01); H04L 49/15 (2013.01); H04L 49/25 (2013.01); H04L 49/357 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/80 (2018.02); H05K 7/1485 (2013.01); H05K 2201/066 (2013.01); H05K 2201/10121 (2013.01); H05K 2201/10159 (2013.01); H05K 2201/10189 (2013.01); Y02D 10/14 (2018.01); Y02D 10/151 (2018.01); Y02P 90/30 (2015.11); Y04S 10/54 (2013.01); Y10S 901/01 (2013.01)

(56) References Cited

U.S. PATENT DOCUMENTS

| | | | |
|---|---|---|---|
| 9,032,250 B1* | 5/2015 | Krieger | G01R 19/22 714/14 |
| 2012/0116590 A1 | 5/2012 | Florez-Larrahondo et al. | |
| 2012/0243172 A1* | 9/2012 | Ross | G06F 1/187 361/679.37 |
| 2013/0058028 A1 | 3/2013 | Lu et al. | |
| 2013/0188309 A1 | 7/2013 | Ross | |
| 2013/0342968 A1* | 12/2013 | Peterson | H05K 7/1457 361/622 |
| 2014/0362515 A1 | 12/2014 | Pronozuk et al. | |
| 2015/0334867 A1 | 11/2015 | Faw et al. | |
| 2016/0205800 A1* | 7/2016 | Roberts | H05K 7/14 361/809 |

OTHER PUBLICATIONS

Written opinion for PCT application No. PCT/US2017/038516, dated Aug. 30, 2017 (6 pages).

* cited by examiner

TECHNOLOGIES FOR PROVIDING POWER TO A RACK

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Typical enterprise-level data centers can include several to hundreds of racks or cabinets, with each rack/cabinet housing multiple servers. Each of the various servers of a data center may be communicatively connectable to each other via one or more local networking switches, routers, and/or other interconnecting devices, cables, and/or interfaces. The number of racks and servers of a particular data center, as well as the complexity of the design of the data center, may depend on the intended use of the data center, as well as the quality of service the data center is intended to provide.

Traditional servers of a data center are self-contained compute devices designed to be mounted into a corresponding rack of the data center. To do so, typical data center servers include a housing with corresponding mounting mechanisms, such as brackets, to facilitate the mounting of the server into the rack or cabinet. The electrical components of the server are located within the housing, and the housing provides an amount of protection to the electrical components from the local environment. Additionally, typical servers often include their own peripheral components or systems, such as an internal power supply and internal cooling.

Traditional rack systems are self-contained physical support structures that include a number of pre-defined server spaces. A server may be mounted in each pre-defined server space. Typical rack systems often include an enclosure or housing in which the pre-defined server spaces are located.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
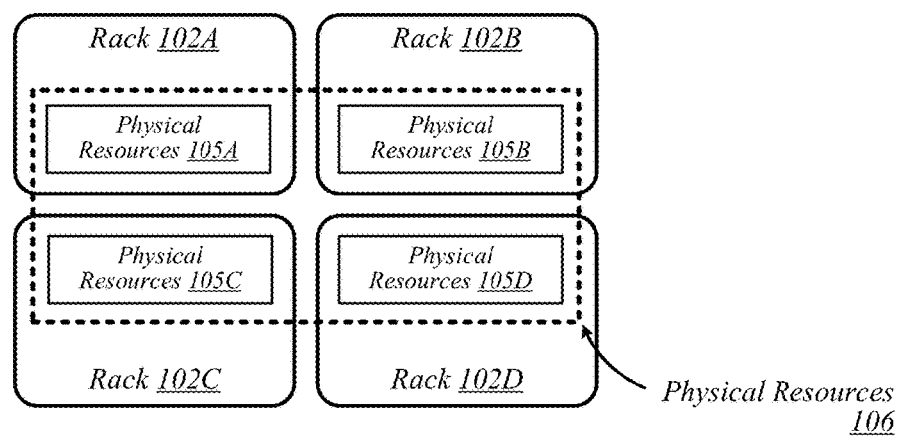
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
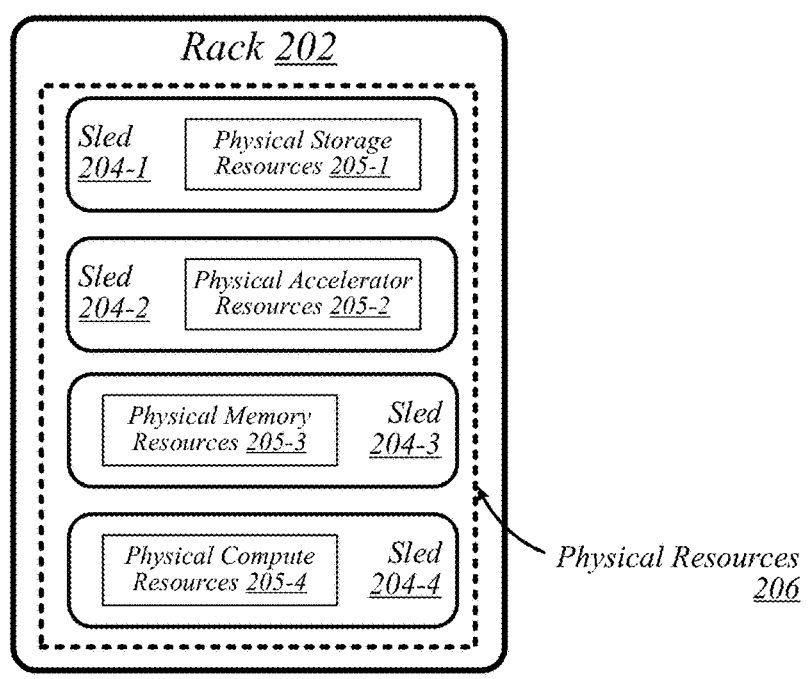
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
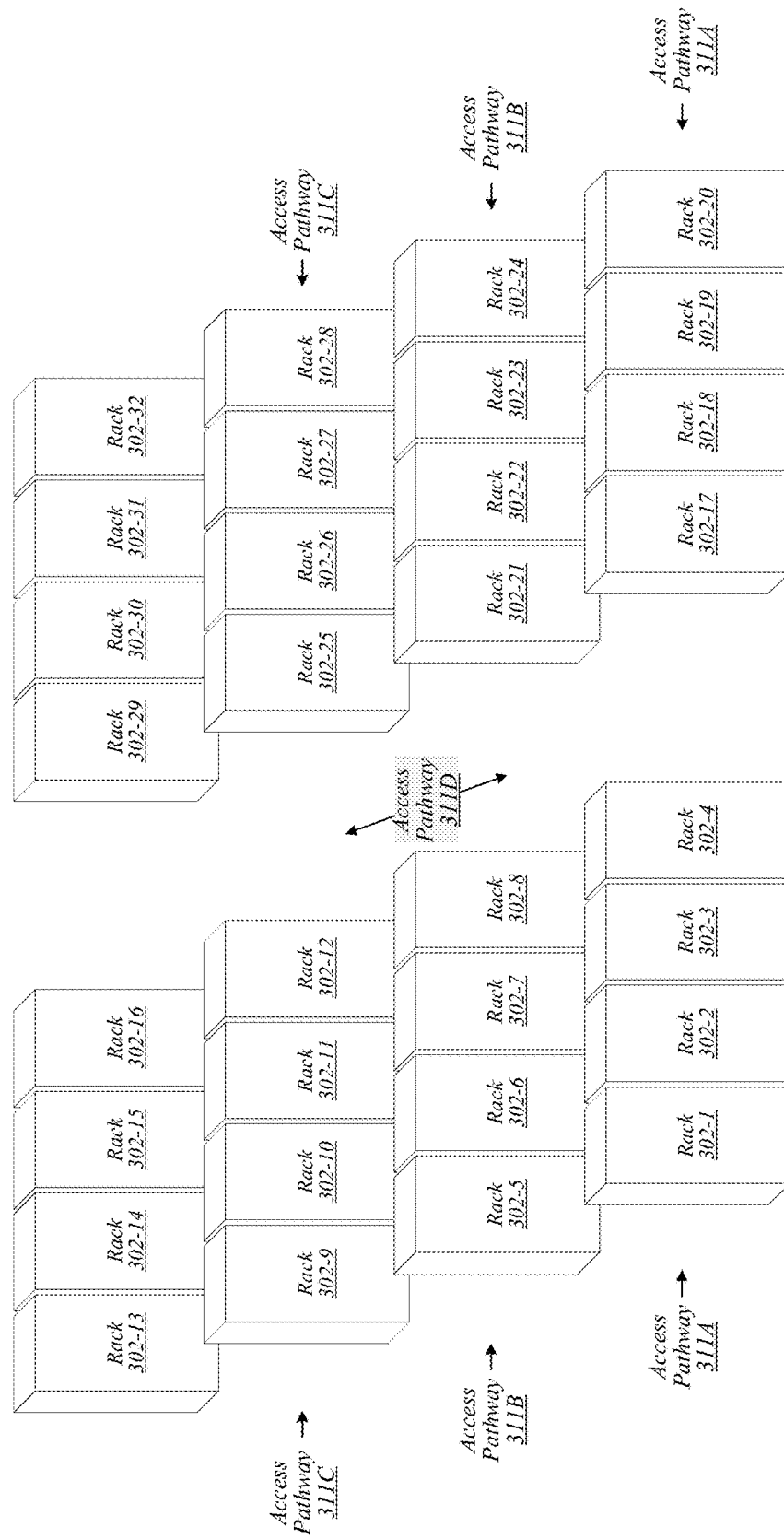
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
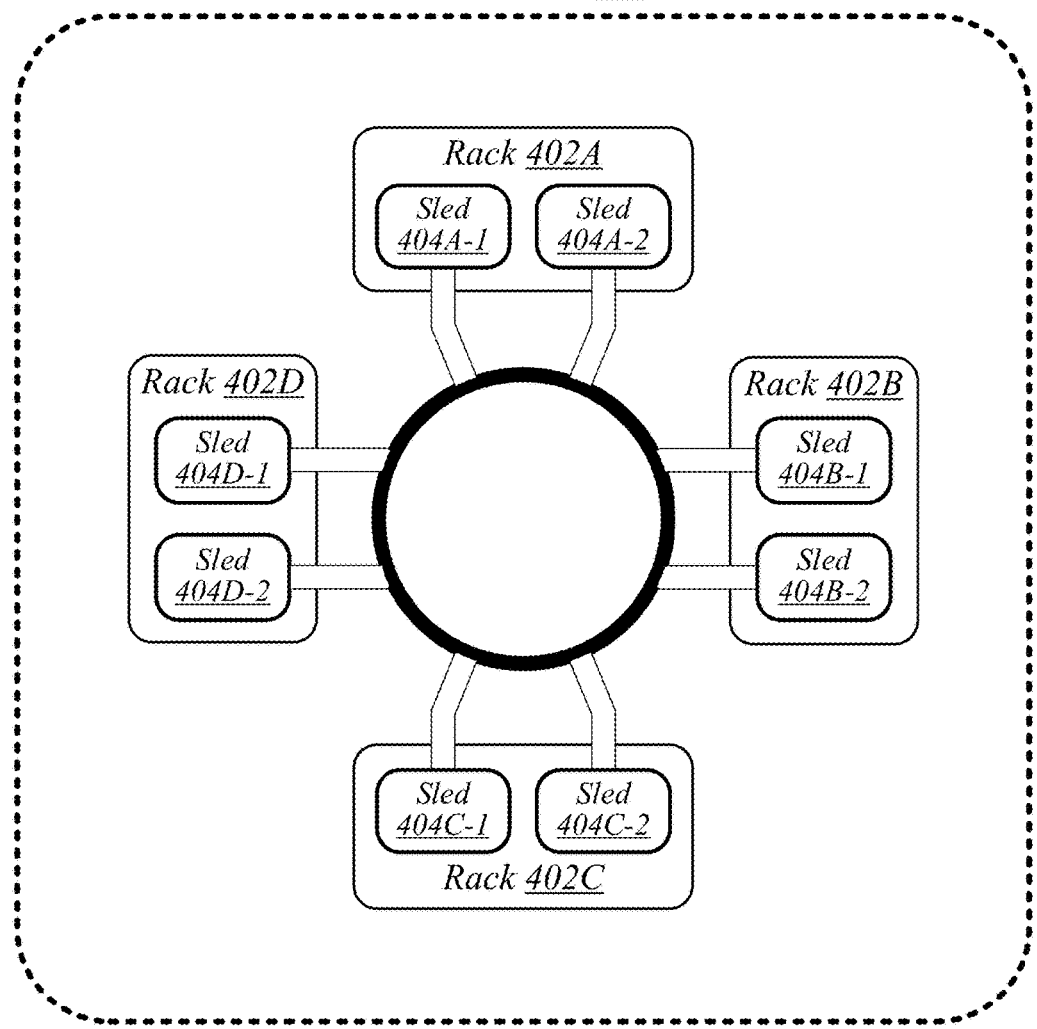
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
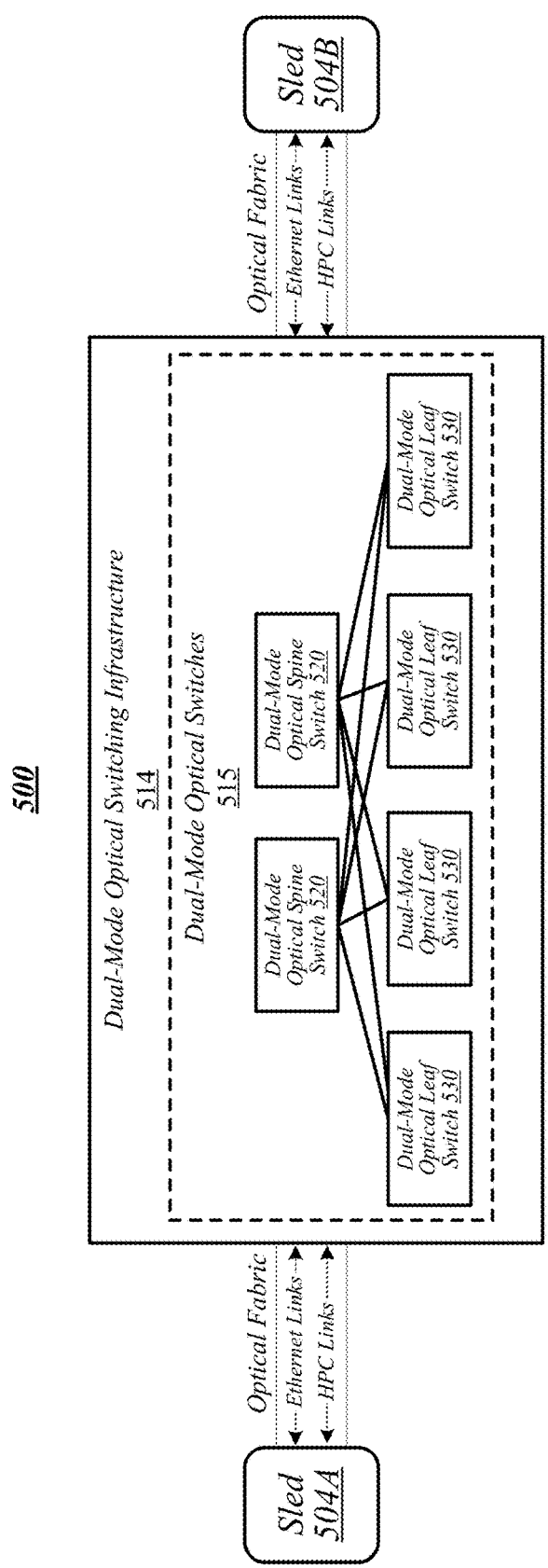
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
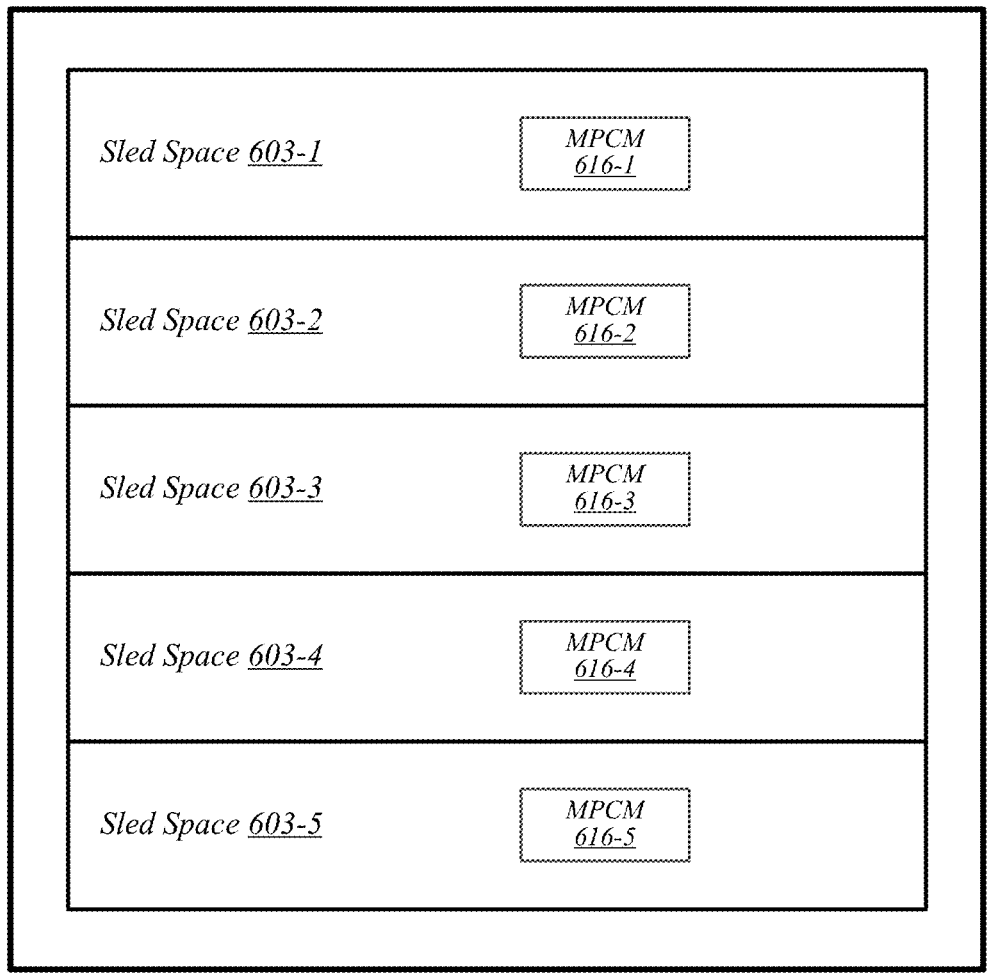
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
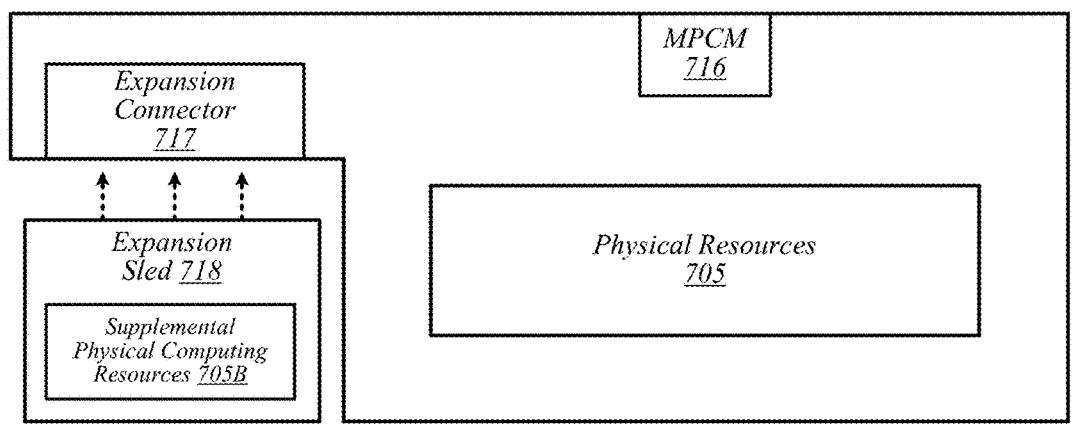
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
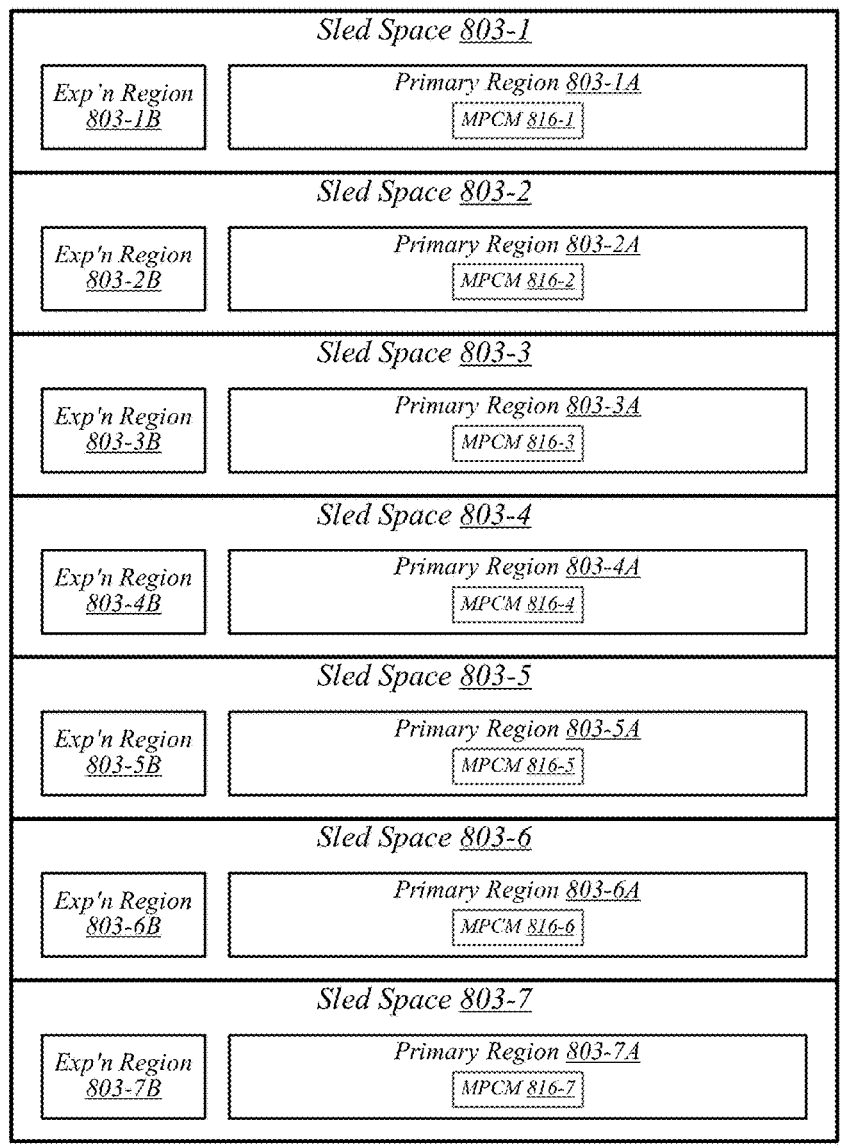
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
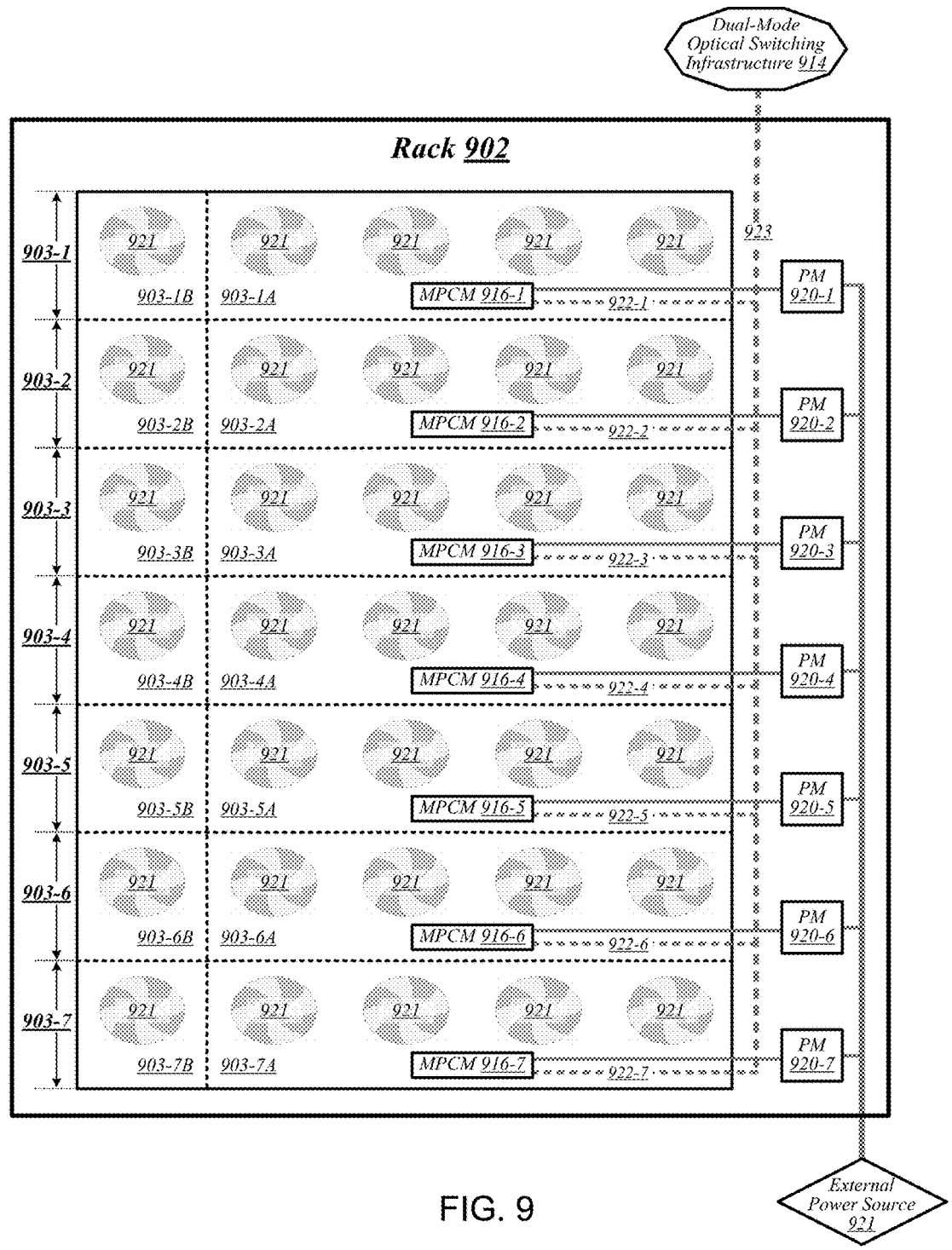
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heatsinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
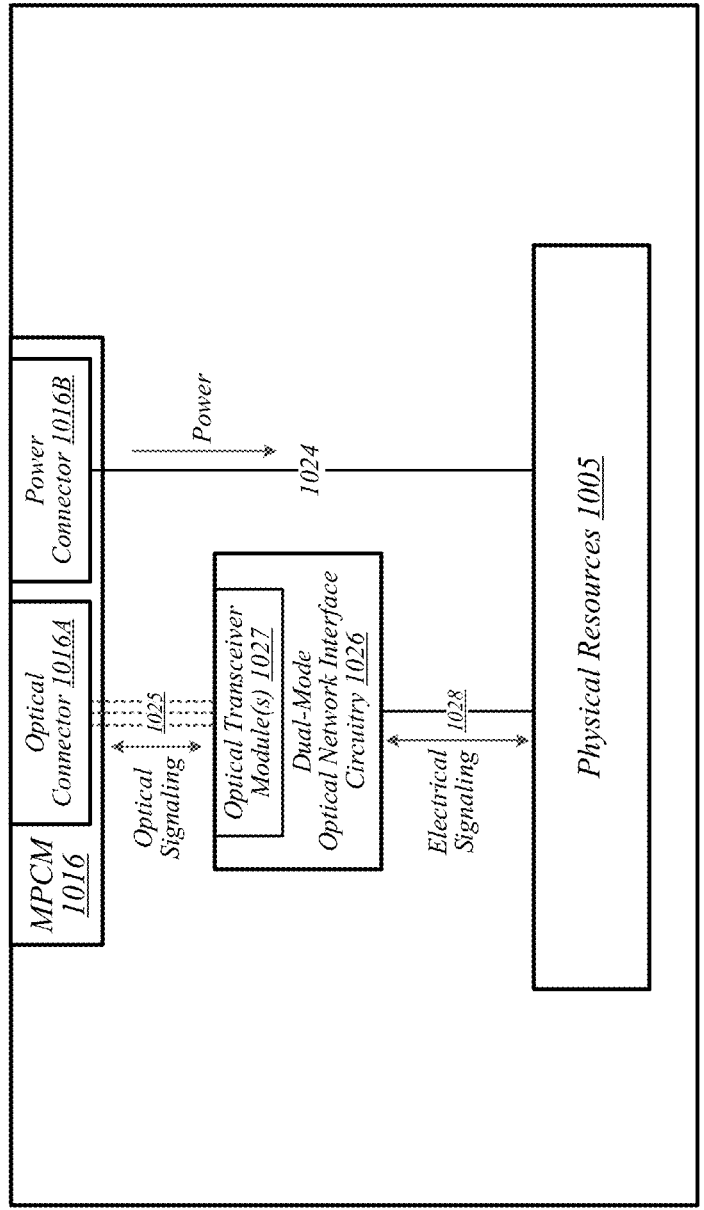
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heatsinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
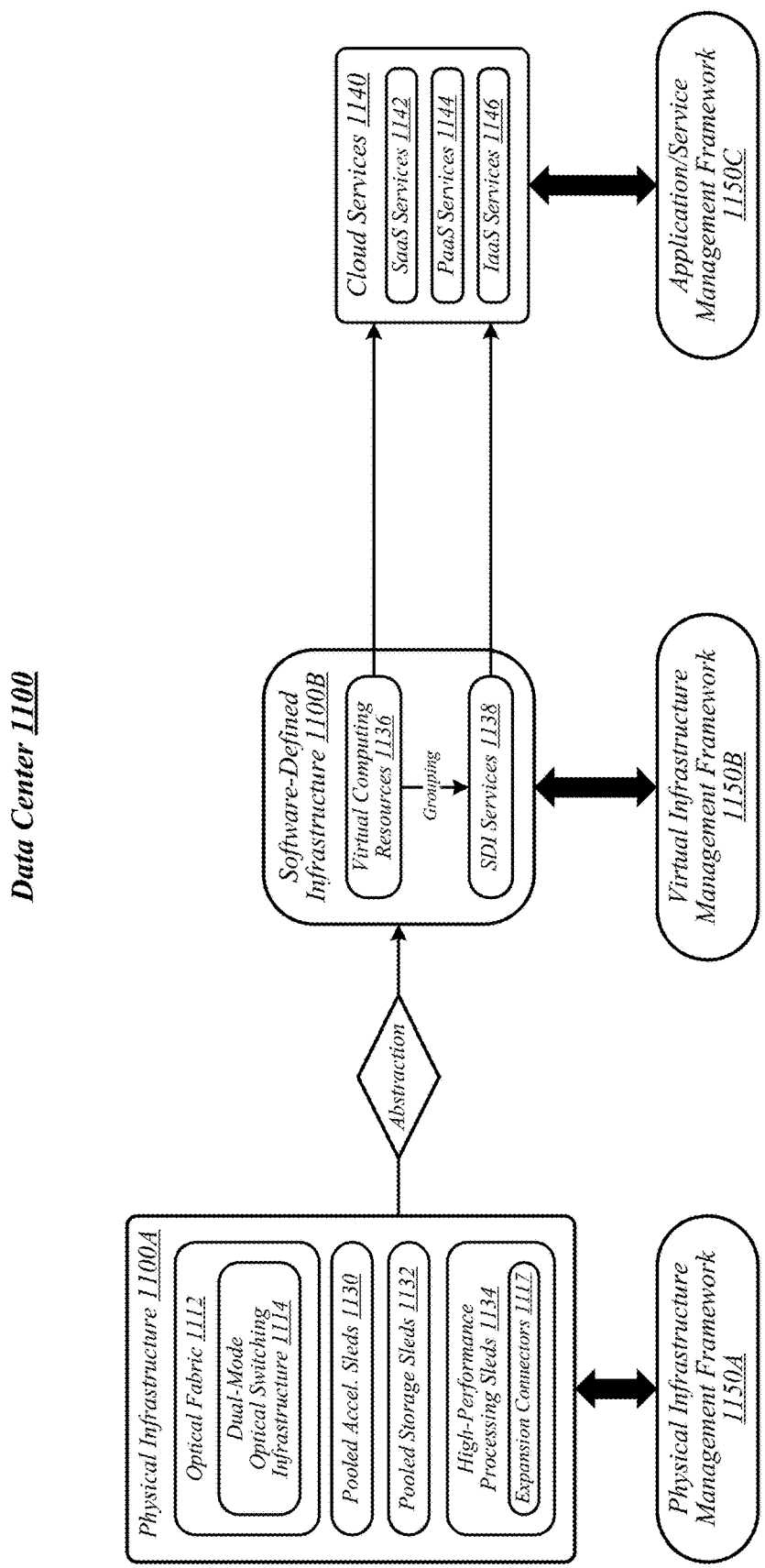
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
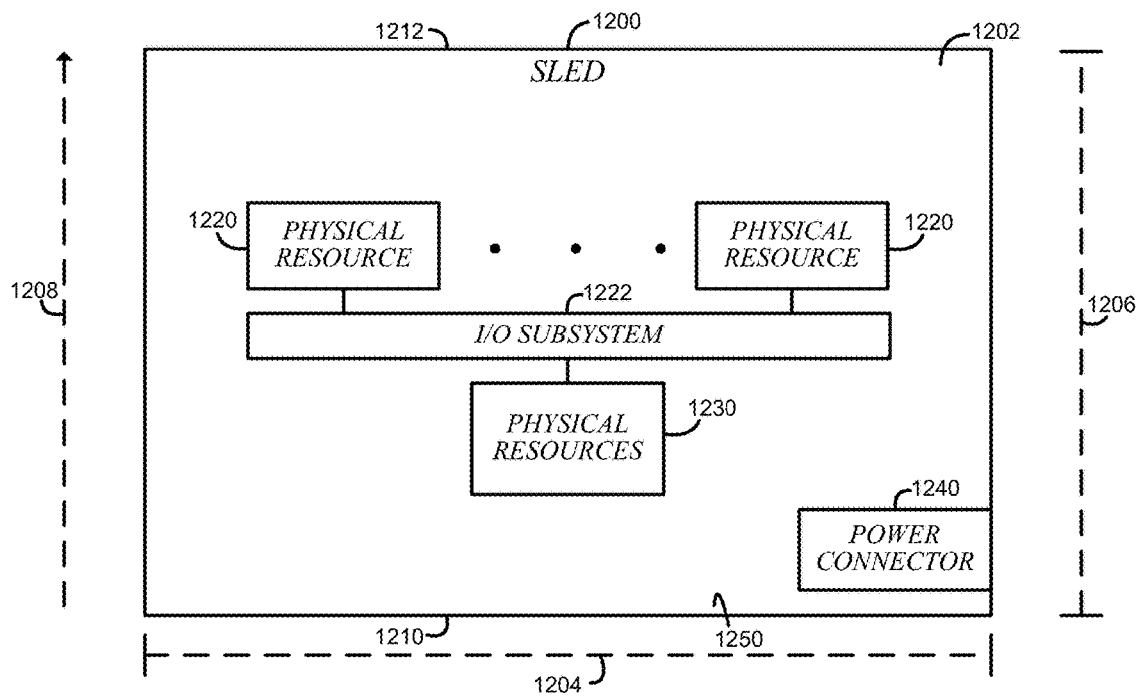
FIG. 12 is a simplified block diagram of at least one embodiment of a top side of a sled usable in the data center of FIGS. 1, 3, 4, and/or 11.
Figure 13:
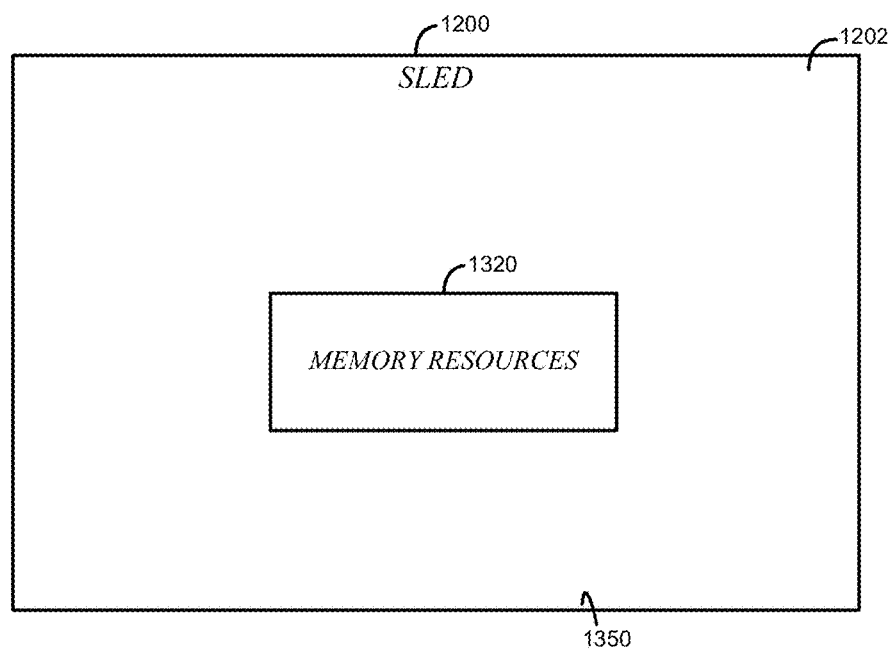
FIG. 13 is a simplified block diagram of at least one embodiment of a bottom side of the sled of FIG. 12.

Referring now to FIGS. 12 and 13, each of the sleds 204, 404, 504, 704, 1004 may be embodied as a sled 1200 in some embodiments. As discussed in more detail below, the sled 1200 is configured to be mounted in a corresponding rack 1400 (see FIGS. 14-16) of the data center 100, 300, 400, 1100. In some embodiments, the sled 1200 may be optimized or otherwise configured for performing particular tasks, such as compute tasks, acceleration tasks, data storage tasks, etc.

The illustrative sled 1200 includes a chassis-less circuit board substrate 1202, which supports various electrical components mounted thereon. It should be appreciated that the circuit board substrate 1202 is "chassis-less" in that the sled 1200 does not include a housing or enclosure. Rather, the chassis-less circuit board substrate 1202 is open to the local environment. The chassis-less circuit board substrate 1202 may be formed from any material capable of supporting the various electrical components mounted thereon. For example, in an illustrative embodiment, the chassis-less circuit board substrate 1202 is formed from an FR-4 glass-reinforced epoxy laminate material. Of course, other materials may be used to form the chassis-less circuit board substrate 1202 in other embodiments.

The chassis-less circuit board substrate 1202 includes multiple features that improve the thermal cooling characteristics of the various electrical components mounted on the chassis-less circuit board substrate 1202. As discussed, the chassis-less circuit board substrate 1202 does not include a housing or enclosure, which may improve the airflow over the electrical components of the sled 1200 by reducing those structures that may inhibit air flow. For example, because the chassis-less circuit board substrate 1202 is not positioned in an individual housing or enclosure, there is no backplane (e.g., a backplate of the chassis) to the chassis-less circuit board substrate 1202, which could inhibit air flow across the electrical components. Additionally, the chassis-less circuit board substrate 1202 has a geometric shape configured to reduce the length of the airflow path across the electrical components mounted to the chassis-less circuit board substrate 1202. For example, the illustrative chassis-less circuit board substrate 1202 has a width 1204 that is greater than a depth 1206 of the chassis-less circuit board substrate 1202. In one particular embodiment, for example, the chassis-less circuit board substrate 1202 has a width of about 21 inches and a depth of about 9 inches, compared to a typical server that has a width of about 17 inches and a depth of about 30 inches. As such, an airflow path 1208 that extends from a front edge 1210 of the chassis-less circuit board substrate 1202 toward a rear edge 1212 has a shorter distance relative to typical servers, which may improve the thermal cooling characteristics of the sled 1200. Furthermore, although not illustrated in FIG. 12, the various electrical components mounted to the chassis-less circuit board substrate 1202 are mounted in corresponding locations such that no two substantively heat-producing electrical components shadow each other as discussed in more detail below. That is, no two electrical components, which produce appreciable heat during operation (i.e., greater than nominal heat), are mounted to the chassis-less circuit board substrate 1202 linearly in-line with each other along the direction of the airflow path 1208 (i.e., along a direction extending from the front edge 1210 toward the rear edge 1212 of the chassis-less circuit board substrate 1202).

The illustrative sled 1200 includes one or more physical resources 1220 mounted to a top side 1250 of the chassis-less circuit board substrate 1202. Although two physical resources 1220 are shown in FIG. 12, it should be appreciated that the sled 1200 may include one, two, or more physical resources 1220 in other embodiments. The physical resources 1220 may be embodied as any type of processor, controller, or other compute circuit capable of performing various tasks such as compute functions and/or controlling the functions of the sled 1200 depending on, for example, the type or intended functionality of the sled 1200. For example, as discussed in more detail below, the physical resources 1220 may be embodied as high-power processors in embodiments in which the sled 1200 is embodied as a compute sled, as accelerator co-processors or circuits in embodiments in which the sled 1200 is embodied as an accelerator sled, and/or storage controllers in embodiments in which the sled 1200 is embodied as a storage sled.

The sled 1200 also includes one or more additional physical resources 1230 mounted to the top side 1250 of the chassis-less circuit board substrate 1202. In the illustrative embodiment, the additional physical resources include a network interface controller (NIC), a host fabric interface (HFI), and/or other communication circuitry. Of course, depending on the type and functionality of the sled 1200, the physical resources 1230 may include additional or other electrical components, circuits, and/or devices in other embodiments.

The sled 1200 may also include one or more additional physical resources 1228 mounted to the top side 1250 of the chassis-less circuit board substrate 1202. The additional physical resources may include, for example, additional memory, co-processors, data storage, and/or other compute, memory, or storage resources depending on the type and functionality of the sled 1200.

The physical resources 1220 are communicatively coupled to the additional physical resources 1230 via an input/output (I/O) subsystem 1222. The I/O subsystem 1222 may be embodied as circuitry and/or components to facilitate input/output operations with the physical resources 1220, the additional physical resources 1228, and/or other components of the sled 1200. For example, the I/O subsystem 1222 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 1222 is embodied as, or otherwise includes, a double data rate 4 (DDR4) data bus or a DDR5 data bus.

The sled 1200 also includes a power connector 1240 configured to mate with a corresponding power connector 1482 of the rack 1400 (see, e.g., FIGS. 14-16) when the sled 1200 is mounted in the rack 1400 as discussed below. The sled 1200 receives power from a power supply 1480 of the rack 1400 via the power connector 1240 to supply power to the various electrical components of the sled 1200. That is, the sled 1200 does not include any local power supply (i.e., an on-board power supply) to provide power to the electrical components of the sled 1200. The exclusion of a local or on-board power supply facilitates the reduction in the overall footprint of the chassis-less circuit board substrate 1202, which may increase the thermal cooling characteristics of the various electrical components mounted on the chassis-less circuit board substrate 1202 as discussed above.

In addition to lacking a local or on-board power supply, it should be appreciated that the illustrative sled 1200 also does not include a local or on-board cooling system to cool the electrical components of the sled 1200. That is, the sled 1200 does not include on-board fans or other active cooling devices or systems. For example, while the physical resources 1220 may include heatsinks or other passive cooing devices, the heatsinks of the physical resources 1220 do not include fans attached thereto. Additionally, because the chassis-less circuit board substrate 1202 does not include a housing or enclosure, there are no fans or other active cooling systems attached to a housing as is typical in standard servers.

Referring now to FIG. 13, in addition to the physical resources 1230 mounted on the top side 1250 of the chassis-less circuit board substrate 1202, the sled 1200 also includes one or more memory devices 1320 mounted to a bottom side 1350 of the chassis-less circuit board substrate 1202. That is, the chassis-less circuit board substrate 1202 is embodied as a double-sided circuit board. The physical resources 1220 are communicatively coupled to the memory devices 1320 via the I/O subsystem 1222. For example, the physical resources 1220 and the memory devices 1320 may be communicatively coupled by one or more vias extending through the chassis-less circuit board substrate 1202. Each physical resource 1220 may be communicatively coupled to a different set of one or more memory devices 1320 in some embodiments. Alternatively, in other embodiments, each physical resource 1220 may be communicatively coupled to each memory devices 1320.

The memory devices 1320 may be embodied as any type of memory device capable of storing data for the physical resources 1220 during operation of the sled 1200. For example, in the illustrative embodiments the memory devices 1320 are embodied as dual in-line memory modules (DIMMs), which may support DDR, DDR2, DDR3, DDR4, or DDR5 random access memory (RAM). Of course, in other embodiments, the memory devices 1320 may utilize other memory technologies, including volatile and/or non-volatile memory. For example, types of volatile memory may include, but are not limited to, data rate synchronous dynamic RAM (DDR SDRAM), static random-access memory (SRAM), thyristor RAM (T-RAM) or zero-capacitor RAM (Z-RAM). Types of non-volatile memory may include byte or block addressable types of non-volatile memory. The byte or block addressable types of non-volatile memory may include, but are not limited to, 3-dimensional (3-D) cross-point memory, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

It should be appreciated that the sled 1200 may have configurations and topologies different from the illustrative embodiments described herein in other embodiments. As such, it should be appreciated that the component diagrams illustrated in FIGS. 12 and 13 are merely illustrative logical representations of the sled 1200 and are not limiting. For example, although particular components of the sled 1200 have been described as being mounted on the top side 1250 or bottom side 1350 of the chassis-less circuit board substrate 1202, such components may be mounted on the other side of the chassis-less circuit board substrate 1202 in other embodiments.

Figure 14:
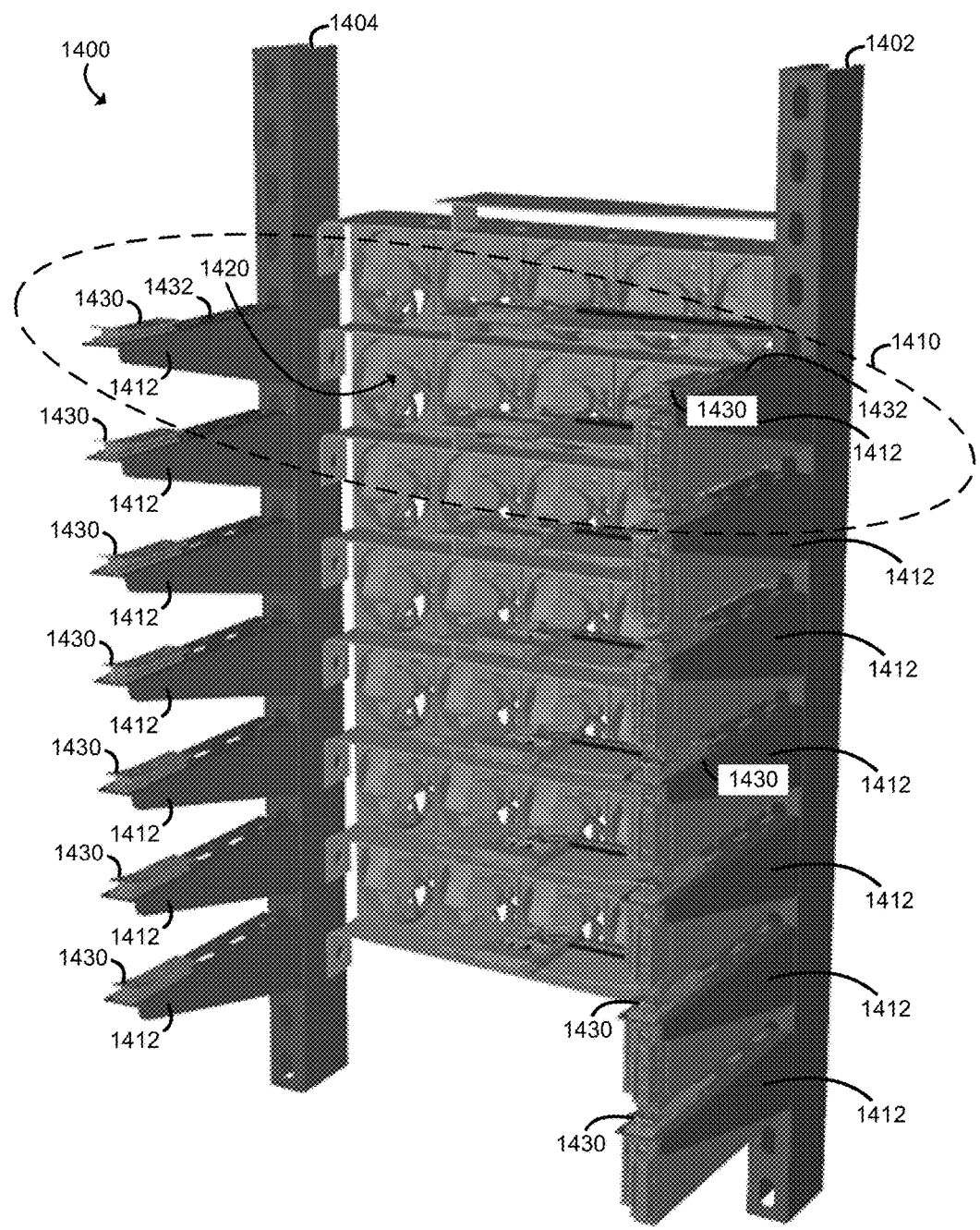
FIG. 14 is a side perspective view of at least one embodiment of a rack of an illustrative data center.
Figure 15:
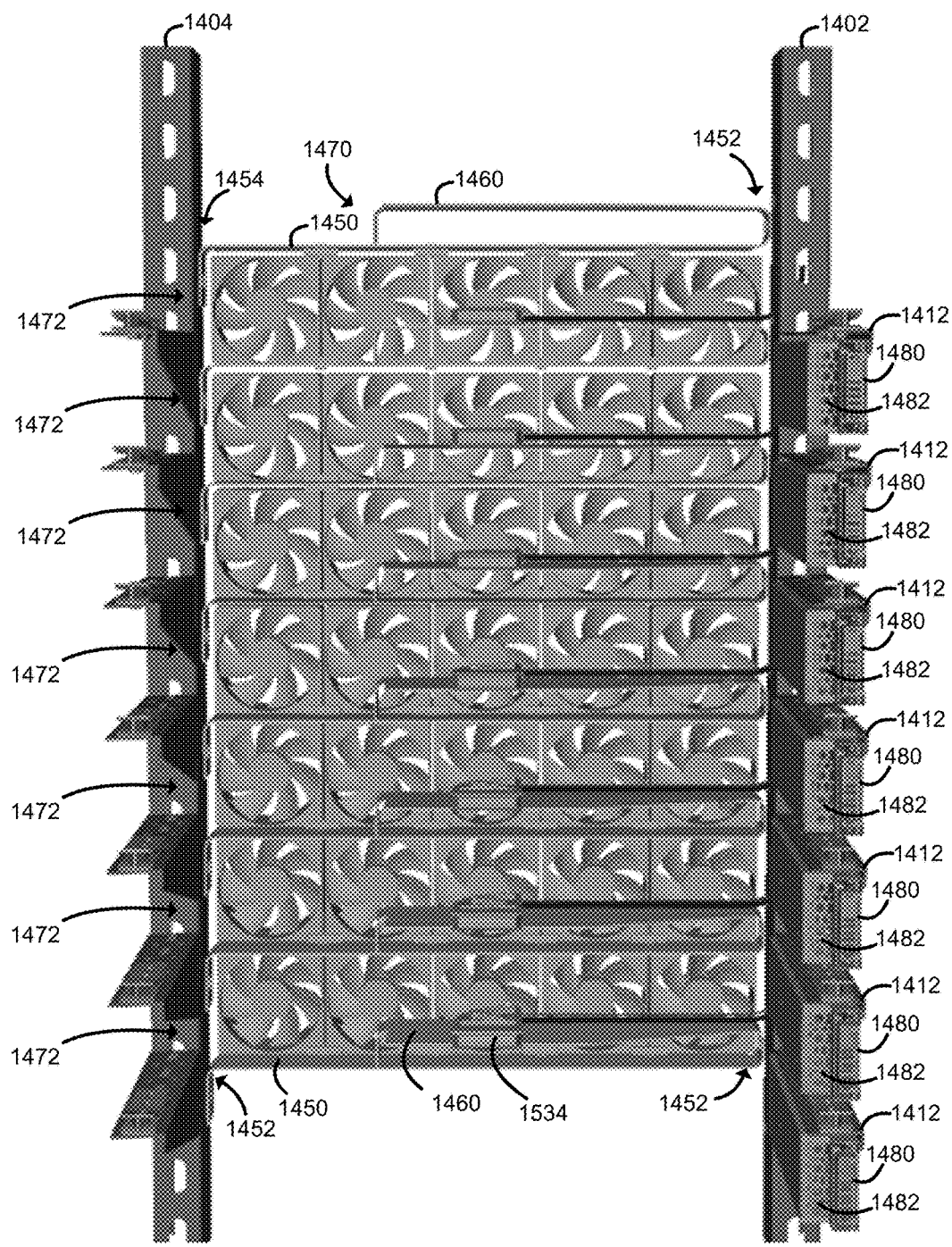
FIG. 15 is a front elevation view of the rack of FIG. 14.
Figure 16:
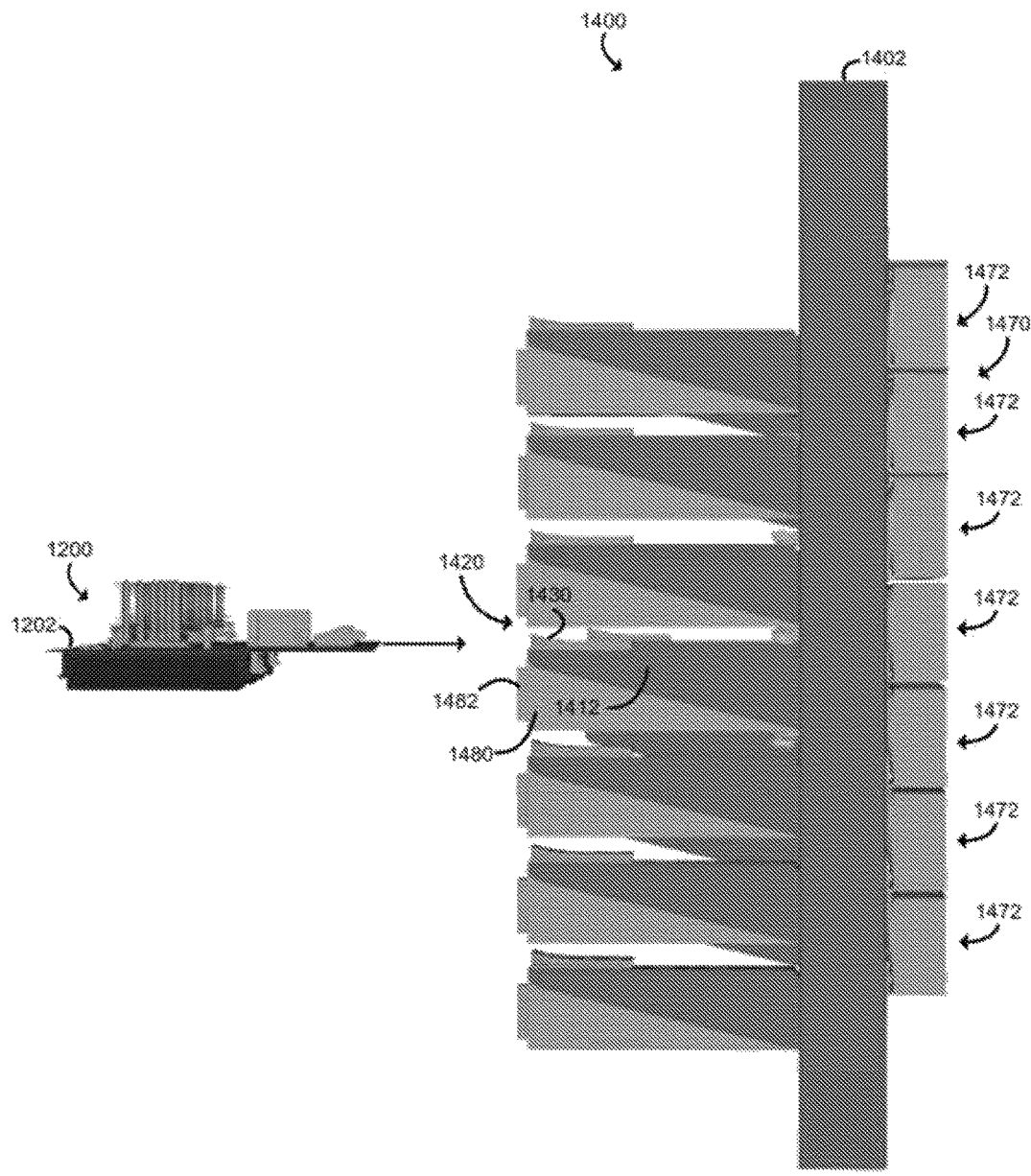
FIG. 16 is a side plan elevation view of the rack of FIG. 14.

Referring now to FIGS. 14-16, each of the racks 102, 202, 302, 402, 902 of the data centers 100, 300, 400, 1100 discussed above may be embodied as a rack 1400 in some embodiments. The illustrative rack 1400 includes two elongated support posts 1402, 1404, which are arranged vertically. For example, the elongated support posts 1402, 1404 may extend upwardly from a floor of a data center 100, 300, 400, 1100 when deployed. The rack 1400 also includes one or more horizontal pairs 1410 of elongated support arms 1412 configured to support a sled 1200 as discussed below. Each pair 1410 of the elongated support arms 1412 includes an elongated support arm 1412 that extends outwardly from the elongated support post 1402 and a corresponding elongated support arm 1412 that extends outwardly from the elongated support post 1404. As an illustrative example, one illustrative pair 1410 of the elongated support arms 1412 is referenced in FIG. 14 with a dashed ellipse.

The elongated support arms 1412 may be coupled to the corresponding elongated support posts 1402, 1404 using any suitable securing mechanisms. For example, in some embodiments, the elongated support arms 1412 may be permanently attached to the corresponding elongated support posts 1402, 1404 via welds, adhesives, or other permanent securing mechanism. Alternatively, in other embodiments, the elongated support arms 1412 may be coupled to the corresponding elongated support posts 1402, 1404 using non-permanent securing mechanisms such as bolts, straps, or other securing devices. In such embodiments, the elongated support arms 1412 may be selectively coupled to the corresponding elongated support posts 1402, 1404 in one of a multiple locations. That is, the elongated support arms 1412 may be adjustable, relative to the elongated support posts 1402, 1404, in some embodiments.

Each pair 1410 of elongated support arms 1412 defines a sled slot 1420 of the rack 1400, which is configured to receive a sled 1200. To do so, each elongated support arm 1412 includes a circuit board guide 1430 secured to, or otherwise mounted to, a top side 1432 of the corresponding elongated support arm 1412. For example, in the illustrative embodiment, each circuit board guide 1430 is mounted at a distal end of the corresponding elongated support arm 1412 relative to the corresponding elongated support post 1402, 1404. For clarity of the Figures, not every circuit board guide 1430 may be referenced in each Figure.

The illustrative rack 1400 includes seven pairs 1410 of elongated support arms 1412 that define a corresponding seven sled slots 1420, each configured to receive and support a corresponding sled 1200 as discussed above. Of course, in other embodiments, the rack 1400 may include additional or fewer pairs 1410 of elongated support arms 1412 (i.e., additional or fewer sled slots 1420). It should be appreciated that because the sled 1200 is chassis-less, the sled 1200 has an overall reduced height relative to typical servers. As such, in some embodiments, the height of each sled slot 1420 may be shorter than the height of a typical server (e.g., shorter than a single rank unit, "1U"). That is, the vertical distance between each pair 1410 of elongated support arms 1412 may be less than a standard rank unit "1U." Additionally, due to the relative decrease in height of the sled slots 1420, the overall height of the rack 1400 may be shorter than the height of traditional rack enclosures. For example, in some embodiments, each of the elongated support posts 1402, 1404 may have a length of six feet or less. Again, in other embodiments, the rack 1400 may have different dimensions. Further, it should be appreciated that the rack 1400 does not include any walls, enclosures, or the like. Rather, the rack 1400 is an enclosure-less rack that is opened to the local environment. Of course, in some cases, an end plate may be attached to one of the elongated support posts 1402, 1404 in those situations in which the rack 1400 forms an end-of-row rack in a data center 100, 300, 400, 1100.

The rack 1400 also includes a cross-support arm 1450 for each pair 1410 of elongated support arms 1412. Each cross-support arm 1450 includes a distal end 1452 secured to the elongated support post 1402 and an opposite distal end 1454 secured to the elongated support post 1404 such that each cross-support arm 1450 extends between the elongated support posts 1402, 1404 in a horizontal direction. Of course, the rack 1400 may include additional cross-support arms 1450 in other embodiments. For example, in the illustrative embodiment, the rack 1400 includes an additional cross-support arm 1450 located toward the top of the elongated support posts 1402, which is used to support a fan array 1470 as discussed below.

Each cross-support arm 1450 includes a support platform 1460 on which a corresponding optical data connector 1434 is mounted. Each optical data connector 1434 is associated with a corresponding sled slot 1420 and is configured to mate with a corresponding optical data connector of a sled 1200 when the sever sled 1200 is received in the corresponding sled slot 1420.

As discussed above, the illustrative rack 1400 also includes a fan array 1470 coupled to the cross-support arms 1450. The fan array 1470 includes one or more rows of cooling fans 1472, which are aligned in a horizontal line between the elongated support posts 1402, 1404 as shown in FIG. 15. In the illustrative embodiment, the fan array 1470 includes a row of cooling fans 1472 for each sled slot 1420 of the rack 1400. As discussed above, each sled 1200 does not include any on-board cooling system and, as such, the fan array 1470 provides cooling for each sled 1200 received in the rack 1400.

The illustrative rack 1400 also includes a power supply 1480 associated with each sled slot 1420. Each power supply 1480 is secured to one of the elongated support arms 1412 of the pair 1410 of elongated support arms 1412 that define the corresponding sled slot 1420. For example, as shown in FIG. 15, the rack 1400 may include a power supply 1480 coupled or secured to each elongated support arm 1412 extending from the elongated support post 1402. Each power supply 1480 includes a power connector 1482 configured to mate with the power connector 1240 of the sled 1200 when the sled 1200 is slid into the corresponding sled slot 1420 as shown in FIG. 16. As discussed above, the sled 1200 does not include any on-board power supply and, as such, the power supplies 1480 provide power to corresponding sleds 1200 when mounted to the rack 1400.

Figure 17:
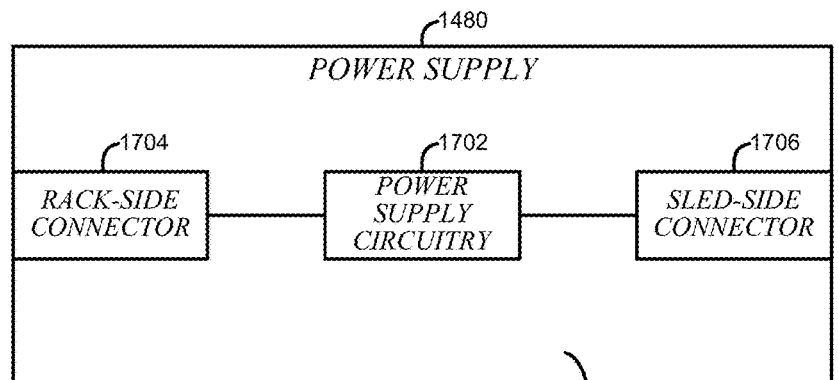
FIG. 17 is a simplified block diagram of at least one embodiment of a power supply of the rack of FIG. 14.
Figure 18:
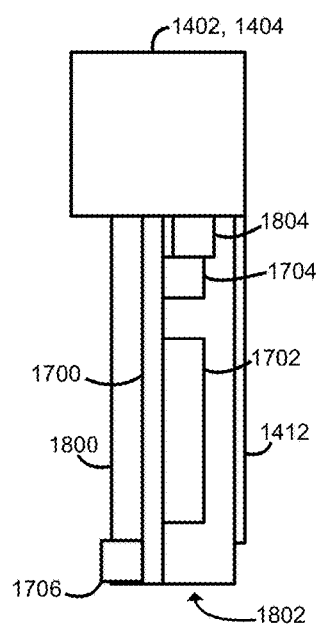
FIG. 18 is a simplified illustration of the power supply of FIG. 17 inserted into a power supply housing of the rack of FIG. 14.

In some embodiments, the power supply 1480 is embodied as a self-contained power supply. For example, the power supply 1480 may include a sealed housing that is secured to the elongated support arm 1412. However, in other embodiments, the power supply 1480 may be removed from the rack 1400. For example, in some embodiments as shown in FIG. 17, the power supply 1480 may be embodied as a chassis-less circuit board substrate 1700 having power supply circuitry 1702 mounted thereon. In such embodiments, the power supply 1480 does not include an enclosure or housing. Rather, a power supply housing 1800 is secured to an elongated support arm 1412 of the rack 1400 as shown in FIG. 18. The power supply housing 1800 includes an access opening 1802 through which the chassis-less circuit board substrate 1700 of the power supply 1480 may be inserted into the power supply housing 1800 and removed therefrom.

The power supply 1480 also includes a rack-side power connector 1704 and a sled-side power connector 1706. Each of the rack-side power connector 1704 and a sled-side power connector 170 are mounted on the chassis-less circuit board substrate 1700 of the power supply 1480. The rack-side power connector 1704 is configured to mate with a power connector 1804 of the rack 1400. The power connector 1804 is located within the power supply housing 1800 and is configured to mate with the rack-side power connector 1704 of the power supply 1480 when the chassis-less circuit board substrate 1700 is inserted into, or otherwise received in, the power supply housing 1800 via the access opening 1802 as shown in FIG. 18.

The sled-side power connector 1706 is configured to mate with the power connector 1240 of the chassis-less circuit board substrate 1202 of the sled 1200. In the illustrative embodiment, the sled-side power connector 1706 is located at a distal end of the chassis-less circuit board substrate 1700 of the power supply 1480; however, the sled-side power connector 1706 may be located in other locations depending on the location of the power connector 1240 of the sled 1200. For example, depending on the location of the power connector 1240, the sled-side power connector 1706 may be located at a distal end of the chassis-less circuit board substrate 1202 relative to the elongated support post 1402, 1404, at a proximal end of the chassis-less circuit board substrate 1202 relative to the elongated support post 1402, 1404, or other position relative to the elongated support post 1402, 1404.

The power supply circuitry 1702 may be embodied as any type of circuitry capable of producing power to supply to a corresponding sled 1200. In the illustrative embodiment, the power supply circuitry 1702 is a step-down power supply. That is, the power supply circuitry 1702 receives an input power at a high voltage from the power connector 1804 of the rack 1400 and produces an output power at the sled-side connector 1706 having a lower voltage than the input power. In an illustrative embodiment, for example, the power supply circuitry 1702 may receive an input power having an input voltage of about 277 and step down the input voltage to an output power having an output voltage of about 12 volts. Of course, the power supply circuitry 1702 may be configured to receive and produce power signals having different voltages, currents, and/or other parameters in other embodiments.

Figure 19:
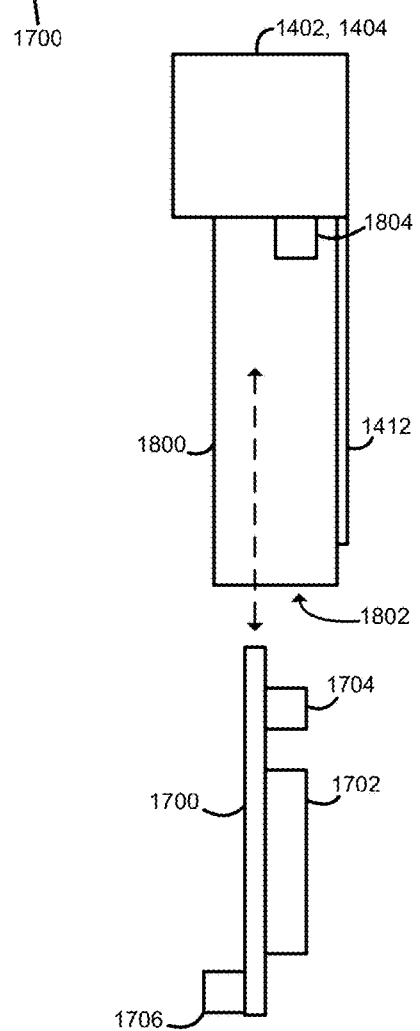
FIG. 19 is a simplified illustration of the power supply of FIG. 17 being removed from the power supply housing of the rack of FIG. 14.

It should be appreciated that, in the illustrative embodiment of FIGS. 17-19, the power supply 1480 is configured to be easily swappable. That is, the power supply circuitry 1702 may be quickly inserted into the power supply housing 1800 and quickly removed therefrom should the power supply 1480 need replaced. In some embodiments, the insertion and removal of the power supply 1480 may be performed by a robot. Additionally, in some embodiments, the power supply 1480 may be removed from the power supply housing 1800 while a sled 1200 is received in a corresponding sled slot 1420 without the need to unmount the sled from the rack 1400. As such, damaged or inoperable power supplies 1480 may be quickly changed without dismounting a corresponding sled 1200.

EXAMPLES

Illustrative examples of the technologies disclosed herein are provided below. An embodiment of the technologies may include any one or more, and any combination of, the examples described below.

Example 1 includes a rack to support a plurality of sleds, the rack comprising two elongated support posts that extend vertically; a plurality of pairs of elongated support arms, wherein each pair of elongated support arms comprises a first support arm that extends outwardly from a first support post of the two elongated support posts and a second support arm that extends outwardly from a second support post of the two elongated supports posts, wherein each pair of elongated support arms defines a sled slot to receive a corresponding sled; and a power supply coupled to each first elongated support arm, wherein each power supply is associated with a corresponding sled slot and includes a sled-side power connector to mate with a corresponding power connector of the corresponding sled when the corresponding sled is received in corresponding sled slot to supply power to electrical components of the corresponding sled.

Example 2 includes the subject matter of Example 1, and wherein each power supply includes a power supply housing secured to the corresponding first elongated support arm.

Example 3 includes the subject matter of any of Examples 1 and 2, and wherein the sled-side power connector of each power supply is located toward a distal end of the corresponding first support arm relative to the first support post.

Example 4 includes the subject matter of any of Examples 1-3, and further including a power supply housing secured to each first elongated support arm, and wherein each power supply comprises a chassis-less circuit board substrate received in a different one of the power supply housings.

Example 5 includes the subject matter of any of Examples 1-4, and wherein each power supply housing includes a power connector positioned within the corresponding power supply housing and mated with a rack-side power connector of the corresponding power supply.

Example 6 includes the subject matter of any of Examples 1-5, and wherein each power supply housing comprises an access opening and the chassis-less circuit board substrate of the corresponding power supply is removable from the corresponding power supply housing through the access opening.

Example 7 includes the subject matter of any of Examples 1-6, and wherein each power supply housing includes a power connector positioned within the housing, the sled-side power connector of each power supply is coupled to the chassis-less circuit board substrate of the corresponding power supply, and each power supply further includes a rack-side power connector coupled to the chassis-less circuit board substrate of the corresponding power supply, wherein the rack-side power connector of each power supply is mated with the power connector of a corresponding power supply housing when the each power supply is received in the corresponding power supply housing.

Example 8 includes the subject matter of any of Examples 1-7, and wherein the power connector of each corresponding power supply supplies a power to the power supply that has an input voltage that is greater than an output voltage of an output power supplied by the corresponding power supply.

Example 9 includes the subject matter of any of Examples 1-8, and wherein each power supply further comprises power supply circuitry coupled to the chassis-less circuit board substrate, wherein each power supply circuitry is coupled to the rack-side connector and the sled-side connector of the corresponding power supply, wherein each power supply circuitry is to step down the input voltage to the output voltage.

Example 10 includes the subject matter of any of Examples 1-9, and wherein the input voltage is about 277 volts.

Example 11 includes the subject matter of any of Examples 1-10, and wherein the output voltage is about 12 volts.

Example 12 includes a data center comprising a rack comprising a first and a second elongated support post, wherein each elongated support post extends vertically, a first elongated support arm coupled to the first elongated support post, wherein the first elongated support arm extends outwardly from the first elongated support post, a second elongated support arm coupled to the second elongated support post, wherein the second elongated support arm extends outwardly from the second elongated support posts, wherein the first elongated support arm and the second elongated support arm cooperate to define a sled slot to receive a corresponding sled, a power supply coupled to the first elongated support arm, wherein the power supply is associated with the sled slot and includes a sled-side power connector; and a sled mounted in the sled slot, wherein the sled includes a chassis-less circuit board substrate and a power connector coupled to the chassis-less circuit board substrate, wherein the power connector is mated to the sled-side power connector of the power supply to receive power from the power supply.

Example 13 includes the subject matter of Example 12, and wherein the power supply includes a power supply housing secured to the first elongated support arm.

Example 14 includes the subject matter of any of Examples 12 and 13, and wherein the sled-side power connector of the power supply is located toward a distal end of the first support arm relative to the first support post.

Example 15 includes the subject matter of any of Examples 12-14, and wherein the rack further comprises a power supply housing secured to the first elongated support arm, and wherein the power supply comprises a chassis-less circuit board substrate received in the power supply housing.

Example 16 includes the subject matter of any of Examples 12-15, and wherein the power supply housing includes a power connector positioned within the power supply housing and mated with a rack-side power connector of the power supply.

Example 17 includes the subject matter of any of Examples 12-16, and wherein the power supply housing comprises an access opening and the chassis-less circuit board substrate of the power supply is removable from the power supply housing through the access opening.

Example 18 includes the subject matter of any of Examples 12-17, and wherein the power supply housing includes a power connector positioned within the housing and the sled-side power connector of the power supply is coupled to the chassis-less circuit board substrate, and the power supply further includes a rack-side power connector coupled to the chassis-less circuit board substrate of the power supply, wherein the rack-side power connector of the power supply is mated with the power connector of the power supply housing when the power supply is received in the power supply housing.

Example 19 includes the subject matter of any of Examples 12-18, and wherein the power connector of each corresponding power supply supplies a power to the power supply that has an input voltage that is greater than an output voltage of an output power supplied by the corresponding power supply.

Example 20 includes the subject matter of any of Examples 12-19, and wherein the power supply further comprises power supply circuitry coupled to the chassis-less circuit board substrate, wherein the power supply circuitry is coupled to the rack-side connector and the sled-side connector of the power supply, and wherein the power supply circuitry is to step down the input voltage to the output voltage.

Example 21 includes the subject matter of any of Examples 12-20, and wherein the input voltage is about 277 volts.

Example 22 includes the subject matter of any of Examples 12-21, and wherein the output voltage is about 12 volts.

Example 23 includes a rack to support a plurality of sleds, the rack comprising two elongated support posts that extend vertically; a plurality of pairs of elongated support arms, wherein each pair of elongated support arms comprises a first support arm that extends outwardly from a first support post of the two elongated support posts and a second support arm that extends outwardly from a second support post of the two elongated supports posts, wherein each pair of elongated support arms defines a sled slot to receive a corresponding sled; a power supply housing coupled to each first elongated support arm, wherein each power supply housing comprises an access opening and a power connector located within the corresponding power supply housing; and a power supply received in each power supply housing, wherein each power supply comprises chassis-less circuit board substrate having a rack-side power connector mated with the power connector of the power supply housing and a sled-side power connector to mate with a power connector of the corresponding sled when the corresponding sled is received in corresponding sled slot to supply power to electrical components of the corresponding sled, wherein the chassis-less circuit board substrate is removable from the corresponding power supply housing via the access opening of the corresponding power supply.

Example 24 includes the subject matter of Example 23, and wherein the sled-side power connector of the chassis-less circuit board substrate of each power supply is located toward a distal end of the corresponding first support arm relative to the first support post.

Example 25 includes the subject matter of any of Examples 23 and 24, and wherein the power connector of each power supply housing supplies a power to the corresponding power supply that has an input voltage that is greater than an output voltage of an output power supplied by the corresponding power supply.

Example 26 includes the subject matter of any of Examples 23-25, and wherein each power supply further comprises power supply circuitry coupled to the corresponding chassis-less circuit board substrate, wherein each power supply circuitry is coupled to the rack-side connector and the sled-side connector of the corresponding power supply, wherein each power supply circuitry is to step down the input voltage to the output voltage.

Example 27 includes the subject matter of any of Examples 23-26, and wherein the input voltage is about 277 volts.

The invention claimed is:

1. A rack to support a plurality of sleds, the rack comprising:
two elongated support posts that extend vertically, wherein the two elongated support posts define a first plane;
a plurality of pairs of elongated support arms, wherein each pair of the plurality of pairs of elongated support arms comprises a first support arm that extends outwardly from a first support post of the two elongated support posts and a second support arm that extends outwardly from a second support post of the two elongated supports posts, wherein each pair of the plurality of pairs of elongated support arms extends substantially orthogonally relative to the first plane and defines a sled slot to receive a corresponding sled; and
a plurality of power supply housings, wherein each power supply housing is secured to a different first elongated support arm and includes (i) a power supply received therein, wherein each power supply comprises a chassis-less circuit board substrate, and (ii) a power connector to supply a power to the corresponding power supply, wherein the supplied power has an input voltage that is greater than an output voltage of an output power supplied by the corresponding power supply;
wherein each power supply is associated with a corresponding sled slot and includes a sled-side power connector to mate with a corresponding power connector of the corresponding sled when the corresponding sled is received in corresponding sled slot to supply power to electrical components of the corresponding sled.

2. The rack of claim 1, wherein each power supply includes a power supply housing secured to the corresponding first elongated support arm.

3. The rack of claim 1, wherein the sled-side power connector of each power supply is located toward a distal end of the corresponding first elongated support arm relative to the first support post.

4. The rack of claim 1, wherein each the power connector positioned within each power supply housing is mated with a rack-side power connector of the corresponding power supply.

5. The rack of claim 1, wherein each power supply housing comprises an access opening and the chassis-less circuit board substrate of the corresponding power supply is removable from the corresponding power supply housing through the access opening.

6. The rack of claim 1, wherein:
the sled-side power connector of each power supply is coupled to the chassis-less circuit board substrate of the corresponding power supply, and
each power supply further includes a rack-side power connector coupled to the chassis-less circuit board substrate of the corresponding power supply,
wherein the rack-side power connector of each power supply is mated with the power connector of a corresponding power supply housing when the each power supply is received in the corresponding power supply housing.

7. The rack of claim 6, wherein each power supply further comprises power supply circuitry coupled to the chassis-less circuit board substrate, wherein each power supply circuitry is coupled to the rack-side connector and the sled-side connector of the corresponding power supply, wherein each power supply circuitry is to step down the input voltage to the output voltage.

8. The rack of claim 7, wherein the input voltage is about 277 volts.

9. The rack of claim 8, wherein the output voltage is about 12 volts.

10. A data center comprising:
a rack comprising:
a first and a second elongated support post, wherein each of the first and the second elongated support posts extends vertically and wherein the first and the second elongated support posts define a first plane,
a first elongated support arm coupled to the first elongated support post, wherein the first elongated support arm extends outwardly from the first elongated support post,
a second elongated support arm coupled to the second elongated support post, wherein the second elongated support arm extends outwardly from the second elongated support posts, wherein the first elongated support arm and the second elongated support arm extend substantially orthogonally relative to the first plane and cooperate to define a sled slot to receive a corresponding sled,
a power supply housing coupled to the first elongated support arm, wherein the power supply housing includes (i) a power supply received therein, wherein the power supply comprises a chassis-less circuit board substrate, and (ii) a power connector to supply a power to the power supply, wherein the supplied power has an input voltage that is greater than an output voltage of an output power supplied by the power supply, and wherein the power supply is associated with the sled slot and includes a sled-side power connector; and
a sled mounted in the sled slot, wherein the sled includes a chassis-less circuit board substrate and a power connector coupled to the chassis-less circuit board substrate, wherein the power connector is mated to the sled-side power connector of the power supply to receive power from the power supply.

11. The data center of claim 10, wherein the sled-side power connector of the power supply is located toward a distal end of the first support arm relative to the first support post.

12. The data center of claim 10, wherein the power connector positioned within the power supply housing is mated with a rack-side power connector of the power supply.

13. The data center of claim 10, wherein the power supply housing comprises an access opening and the chassis-less circuit board substrate of the power supply is removable from the power supply housing through the access opening.

14. The data center of claim 10, wherein the sled-side power connector of the power supply is coupled to the chassis-less circuit board substrate, and
the power supply further includes a rack-side power connector coupled to the chassis-less circuit board substrate of the power supply,
wherein the rack-side power connector of the power supply is mated with the power connector of the power supply housing when the power supply is received in the power supply housing.

15. The data center of claim 14, wherein the power supply further comprises power supply circuitry coupled to the chassis-less circuit board substrate, wherein the power supply circuitry is coupled to the rack-side connector and the sled-side connector of the power supply, and wherein the power supply circuitry is to step down the input voltage to the output voltage.

16. The data center of claim 15, wherein the input voltage is about 277 volts.

17. The data center of claim 16, wherein the output voltage is about 12 volts.

18. A rack to support a plurality of sleds, the rack comprising:
   two elongated support posts that extend vertically, wherein the two elongated support posts define a first plane;
   a plurality of pairs of elongated support arms, wherein each pair of plurality of pairs of elongated support arms comprises a first support arm that extends outwardly from a first support post of the two elongated support posts and a second support arm that extends outwardly from a second support post of the two elongated supports posts, wherein each pair of the plurality of pairs of elongated support arms extends substantially orthogonally relative to the first plane and defines a sled slot to receive a corresponding sled;
   a plurality of power supply housings, wherein each power supply housing is secured to a different first elongated support arm and includes (i) a power supply received therein, wherein each power supply comprises a chassis-less circuit board substrate, (ii) an access opening, and (iii) a power connector to supply a power to the corresponding power supply, wherein the supplied power has an input voltage that is greater than an output voltage of an output power supplied by the corresponding power supply; and
   a power supply received in each power supply housing, wherein each power supply comprises chassis-less circuit board substrate having a rack-side power connector mated with the power connector of the corresponding power supply housing and a sled-side power connector to mate with a power connector of the corresponding sled when the corresponding sled is received in a corresponding sled slot to supply power to electrical components of the corresponding sled, wherein the chassis-less circuit board substrate is removable from the corresponding power supply housing via the access opening of the corresponding power supply.

19. The rack of claim 18, wherein each power supply further comprises power supply circuitry coupled to the corresponding chassis-less circuit board substrate, wherein each power supply circuitry is coupled to the rack-side connector and the sled-side connector of the corresponding power supply, wherein each power supply circuitry is to step down the input voltage to the output voltage.

* * * * *

UNITED STATES PATENT AND TRADEMARK OFFICE
CERTIFICATE OF CORRECTION

Page 1 of 1

PATENT NO. : 10,348,327 B2
APPLICATION NO. : 15/396652
DATED : July 9, 2019
INVENTOR(S) : Matthew J. Adiletta et al.

It is certified that error appears in the above-identified patent and that said Letters Patent is hereby corrected as shown below:

On the Title Page

Item (60), under "Related U.S. Application Data", replace "62/356,969" with --62/365,969--.

Signed and Sealed this
Fifth Day of November, 2019

Andrei Iancu
*Director of the United States Patent and Trademark Office*